(12) United States Patent
Ueda (10) Patent No.: US 10,451,078 B2
(45) Date of Patent: Oct. 22, 2019

(54) AIR-CONDITIONING BLOWER MOTOR UNIT

(71) Applicant: KEIHIN CORPORATION, Shinjuku-ku, Tokyo (JP)

(72) Inventor: Masashi Ueda, Kakuda (JP)

(73) Assignee: KEIHIN CORPORATION, Tokyo (JP)

( * ) Notice: Subject to any disclaimer, the term of this patent is extended or adjusted under 35 U.S.C. 154(b) by 160 days.

(21) Appl. No.: 15/411,384

(22) Filed: Jan. 20, 2017

(65) Prior Publication Data
US 2017/0248147 A1    Aug. 31, 2017

(30) Foreign Application Priority Data

Feb. 29, 2016 (JP) ................... 2016-038410

(51) Int. Cl.
*F04D 25/08* (2006.01)
*F04D 25/06* (2006.01)
(Continued)

(52) U.S. Cl.
CPC ....... *F04D 25/082* (2013.01); *B60H 1/00471* (2013.01); *B60H 1/00521* (2013.01); *F04D 17/16* (2013.01); *F04D 25/068* (2013.01); *F04D 25/0693* (2013.01); *F04D 29/053* (2013.01); *F04D 29/5806* (2013.01);
(Continued)

(58) Field of Classification Search
CPC . H02K 11/33; H02K 9/06; H02K 5/10; H02K 7/14; H02K 9/26; F04D 25/082; F04D 29/4226; F04D 29/5806; F04D 29/5813; B60H 2001/00614
See application file for complete search history.

(56) References Cited

U.S. PATENT DOCUMENTS 4,883,982 A * 11/1989 Forbes ................... F04D 25/08
                                                                310/62
6,107,708 A *  8/2000 Yamaguchi ........ B60H 1/00457
                                                                310/58

(Continued)

FOREIGN PATENT DOCUMENTS

DE    102013203500 A1    9/2014
JP       10051995 A       2/1998
(Continued)

OTHER PUBLICATIONS

SIPO Search Report corresponding to Application No. 201710059513. 3; dated Mar. 9, 2018.

(Continued)

*Primary Examiner* — Dominick L Plakkoottam
(74) *Attorney, Agent, or Firm* — Cantor Colburn LLP (57) ABSTRACT

Provided is an air-conditioning blower motor unit that includes: a brushless motor which has an output shaft to be coupled with an air-conditioning blower fan constituting an air conditioner; a circuit board configured to allow the brushless motor to be driven by a supply of electric power; a casing configured to house the brushless motor and the circuit board; and a base frame configured to support the circuit board and the output shaft. The circuit board on the base frame is disposed at a position eccentric with respect to the output shaft inside the casing.

4 Claims, 6 Drawing Sheets

(51) Int. Cl.
  *F04D 29/58* (2006.01)
  *F04D 29/42* (2006.01)
  *F04D 29/053* (2006.01)
  *B60H 1/00* (2006.01)
  *F04D 17/16* (2006.01)

(52) U.S. Cl.
  CPC ............ *F04D 29/5813* (2013.01); *B60H 2001/00614* (2013.01); *F04D 29/4226* (2013.01)

(56) References Cited

U.S. PATENT DOCUMENTS

| | | | | |
|---|---|---|---|---|
| 6,394,768 | B1* | 5/2002 | Fukuda | H02K 5/00 310/71 |
| 6,998,740 | B2* | 2/2006 | Matsuki | H05K 1/0203 310/64 |
| 7,067,946 | B2* | 6/2006 | Noda | F04D 25/082 310/52 |
| 2014/0373563 | A1* | 12/2014 | Mizutani | B60H 1/00807 62/186 |
| 2015/0295471 | A1* | 10/2015 | Iwai | H02K 9/06 310/62 |

FOREIGN PATENT DOCUMENTS

| | | |
|---|---|---|
| JP | 11332203 A | 11/1999 |
| JP | 2008106611 A | 5/2008 |
| JP | 2008215330 A | 9/2008 |
| JP | 2008280928 A | 11/2008 |
| WO | 2015155034 A1 | 10/2015 |

OTHER PUBLICATIONS

Notice of Reasons for Rejection for corresponding JP Application No. 2016-038410; dated Aug. 29, 2017.

* cited by examiner

AIR-CONDITIONING BLOWER MOTOR UNIT

CROSS REFERENCE TO RELATED APPLICATIONS

Priority is claimed on Japanese Patent Application No. 2016-038410, filed on Feb. 29, 2016, the content of which is incorporated herein by reference.

BACKGROUND OF THE INVENTION

Field of the Invention

The present invention relates to a blower motor unit of an air conditioner mounted in a vehicle such as an automobile.

Description of Related Art

A centrifugal fan unit with a built-in electronic control circuit section (a circuit board) for a motor, the electronic control circuit section being disposed at a position eccentric with respect to an output shaft of the motor, is disclosed, for example, in Japanese Unexamined Patent Application, First Publication No. 2008-215330 (hereinafter, Patent Literature 1). According to the centrifugal fan unit related to Patent Literature 1, since the electronic control circuit section is disposed at a place which was recognized as an unused space of the centrifugal fan unit, an axial size of the centrifugal fan unit can be minimized, and the centrifugal fan unit can be made thinner.

SUMMARY OF THE INVENTION

In the control circuit section (the circuit board) in Patent Literature 1, since a given electronic parts mounting region of the board itself is to be small, a distance between the electronic parts is short and amount of heat generation is easily increased. Furthermore, since the control circuit section (the circuit board) in Patent Literature 1 is fixed to a casing, an area in which the control circuit section (the circuit board) can be installed is restricted depending on an internal shape of the casing. Therefore, the control circuit section (the circuit board) cannot be disposed at an optimal position for cooling, and hence a cooling efficiency of the circuit board is poor.

An aspect according to the present invention has been made in view of the above problems, and is directed to providing a thin air-conditioning blower motor unit in which cooling efficiency of a circuit board is improved.

To accomplish the above object, the present invention employs the following aspects.

(1) An aspect according to the present invention provides an air-conditioning blower motor unit that includes: a brushless motor which has an output shaft to be coupled with an air-conditioning blower fan constituting an air conditioner; a circuit board configured to allow the brushless motor to be driven by a supply of electric power; a casing configured to house the brushless motor and the circuit board; and a base frame configured to support the circuit board and the output shaft. The circuit board on the base frame is disposed at a position eccentric with respect to the output shaft inside the casing.

(2) In the aspect (1), the circuit board may be supported by the base frame inside the casing so as to be spaced from the casing.

(3) In the aspect (1) or (2), the casing may have an air introduction opening for an introducing air introduced inside the casing, the introducing air being divided from an air, which is sent by the blower fan to the air conditioner, through the air introduction opening.

(4) In the aspect (3), the casing may have a central opening around the output shaft, the central opening being intended to discharge the introducing air from the casing. The circuit board may be supported by the base frame within streamlines of the introducing air flowing in from the air introduction opening to the central opening.

(5) In the aspect (4), the base frame may include a plurality of base frame openings through which the introducing air passes within the streamlines of the introducing air flowing in from the air introduction opening to the central opening.

(6) In the aspect (5), the circuit board may include a cut-out portion through which the introducing air passes to the base frame openings.

(7) In the aspect (5) or (6), the casing may include a wall section that guides a flow of the air, which flows in from the air introduction opening, to the central opening.

(8) In any one of the aspects (5) to (7), the brushless motor may include gas flow channels through which the introducing air passes.

(9) In any one of the aspects (1) to (8), the air-conditioning blower motor unit may further include a heat sink member which is partially exposed outside the casing and is adjacent to the circuit board to allow thermal conduction.

According to the aspects of the present invention, the base frame supporting the circuit board is provided. That is, the circuit board is not directly mounted on the casing. Thereby, the circuit board can be installed at an arbitrary position regardless of a shape of the casing, and be disposed at an optimum position which adapted to cooling the circuit board. Therefore, it is possible to improve cooling efficiency of the circuit board.

DETAILED DESCRIPTION OF THE INVENTION

Hereinafter, an embodiment of a blower motor unit 1 (an air-conditioning blower motor unit) according to the present invention will be described with reference to the drawings.

Figure 1:
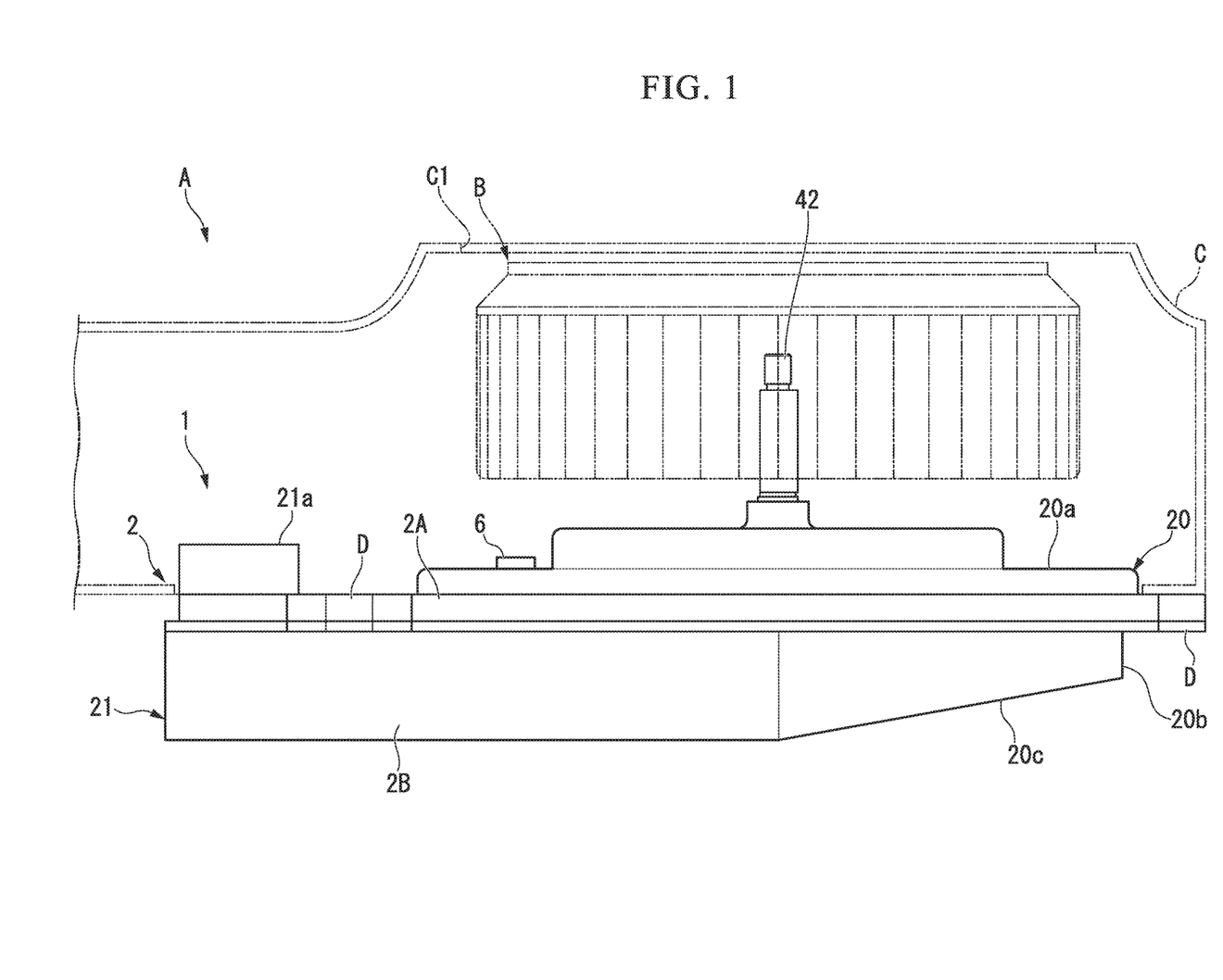
FIG. 1 is a side view illustrating a blower provided with a blower motor unit according to an embodiment of the present invention.

A blower A is disposed in a duct constituting an air conditioner for a vehicle. This blower A is provided with a blower motor unit 1, a blower fan B, and a fan case C housing the blower fan B. The blower fan B is a centrifugal fan having a plurality of blades on an outer circumferential portion thereof. This blower fan B is turned by the blower motor unit 1, and thereby suctions an air from an air inlet C1 formed in the fan case C to send the air via an air outlet (not shown). The blower motor unit 1 is attached to the fan case C via a bracket D. Although not illustrated, an evaporator cooling the air and an air-conditioning device such as a heater core heating the air are set up downstream in an air-sending direction of the air sent from the blower fan B.

In the following description, a side at which the blower fan B is coupled with the blower motor unit 1 is referred to as an upper side.

Figure 2:
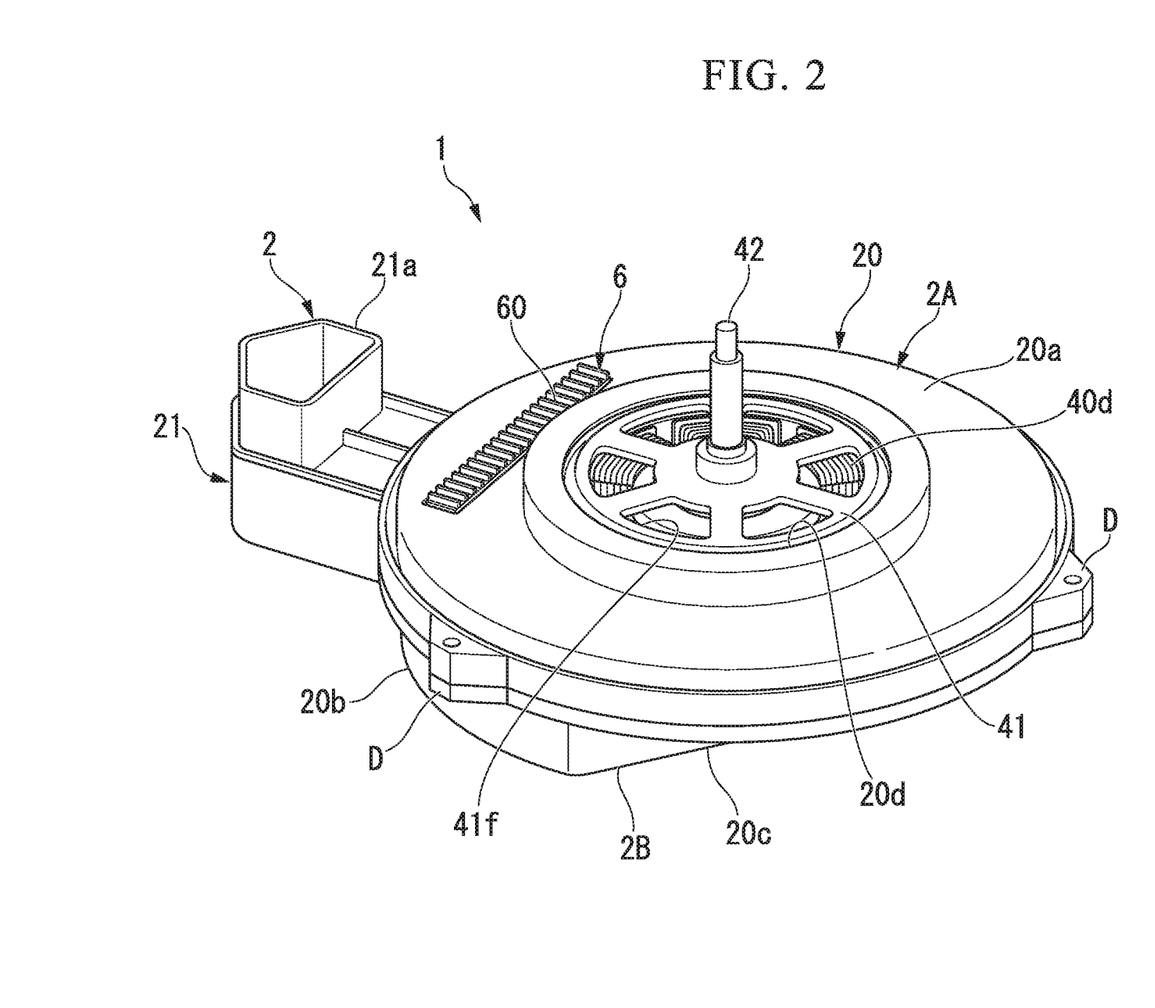
FIG. 2 is a perspective view illustrating the blower motor unit according to the embodiment of the present invention.
Figure 3:
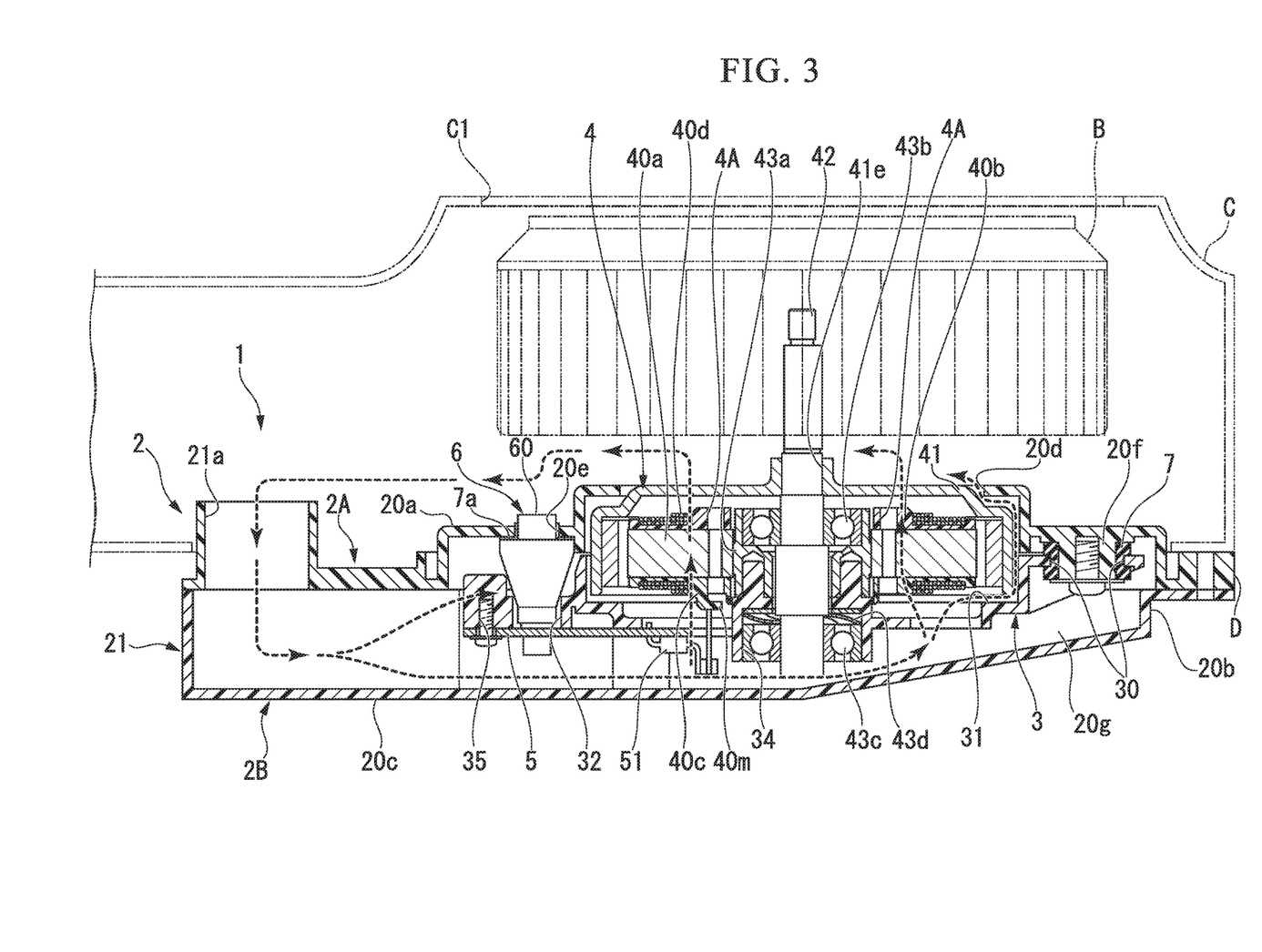
FIG. 3 is a cross-sectional view illustrating a flow of air of the blower motor unit according to the embodiment of the present invention.

The blower motor unit 1 is an air-conditioning blower motor unit provided for the blower A and, as illustrated in FIGS. 2 and 3, is provided with a casing 2, a base frame 3, a motor 4, a circuit board 5, a heat sink member 6, and elastic members 7. The casing 2 has a casing section 20 and a gas guide section 21, the casing section 20 housing the base frame 3, the motor 4, the circuit board 5, the heat sink member 6, and the elastic members 7. The casing section 20 and the gas guide section 21 are integrally formed by combining an upper casing section 2A and a lower casing section 2B, as divided into two parts as upper and lower parts, these parts are abutted at a circumferential surface section 20b. The upper casing section 2A is an upper member including a top section 20a and an introduction opening 21a that will be described below, and the lower casing section 2B is a lower member including a bottom section 20c that will be described below.

The casing section 20 is a container-like part that has the top section 20a, the circumferential surface section 20b and the bottom section 20c, and is formed in an approximately cylindrical flat shape. This casing section 20 has a central opening 20d that is opened to the top section 20a, a heat sink member exposure opening 20e, protrusion sections 20f provided for the top section 20a, and a guide wall section 20g provided for the bottom section 20c (see FIGS. 4A and 4B).

The central opening 20d is an opening that is formed in the central portion of the top section 20a and spatially connects an inside of the casing 2 in which the motor 4 is housed and an inside of the fan case C in which the blower fan B is housed. That is, the central opening 20d is in a state in which the motor 4 is exposed to the fan case C side. The heat sink member exposure opening 20e is an opening that freely fits an upper end 60 of the heat sink member 6 in a swingable way wherein the upper end 60 of the heat sink member 6 is formed at a position corresponding to the heat sink member 6 disposed nearly midway between an output shaft 42 of the motor 4 and the introduction opening 21a. This heat sink member exposure opening 20e is provided to expose the upper end 60 of the heat sink member 6 to the fan case C side by causing the upper end 60 of the heat sink member 6 to protrude outside of the casing 2.

Figure 4A:
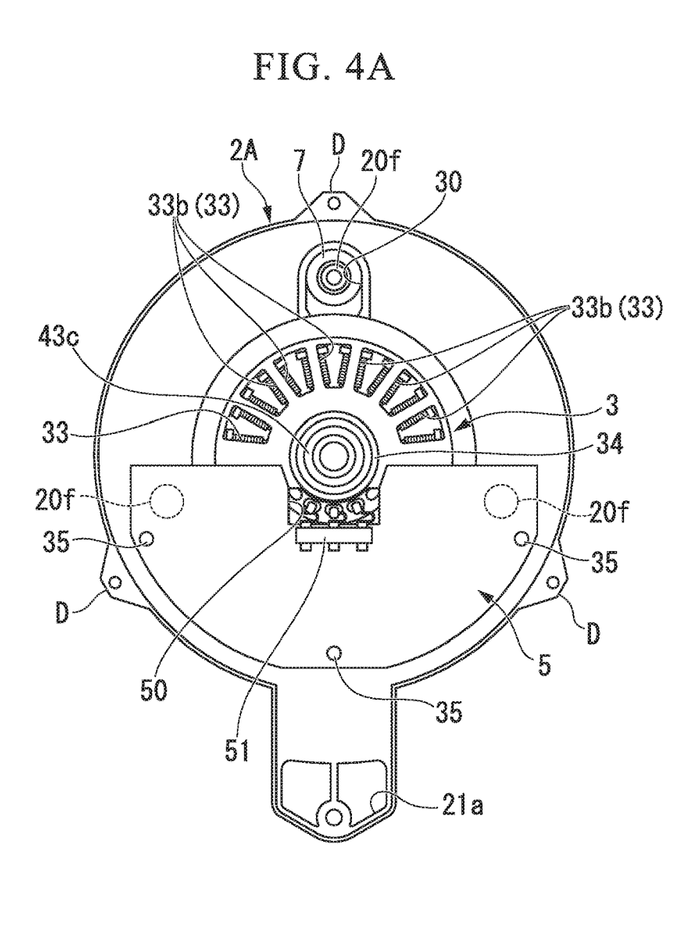
FIG. 4A is a bottom view in which a lower casing section of the blower motor unit according to the present embodiment is omitted.
Figure 4B:
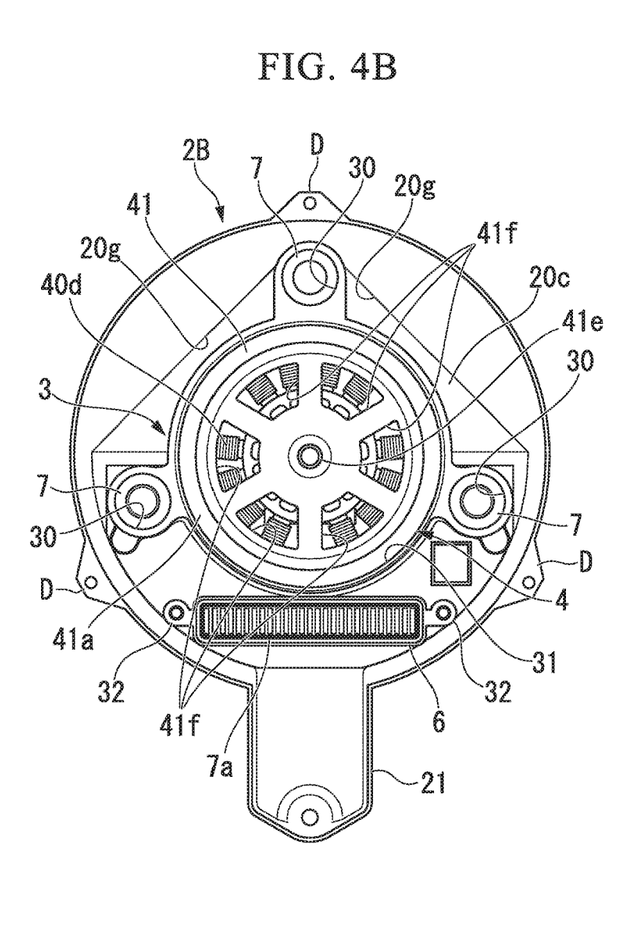
FIG. 4B is a top view in which an upper casing section of the blower motor unit according to the present embodiment is omitted.

The protrusion sections 20f are cylindrical parts that are formed by protruding downward (inside the casing 2) from the top section 20a of the upper casing section 2A at a plurality of places (three places). As illustrated in FIGS. 4A and 4B, the guide wall section 20g is a standing wall section that rises from the bottom section 20c of the lower casing section 2B and becomes a tapered shape to form a tapered surface at a position opposite to the gas guide section 21. This guide wall section 20g guides a flow of an introducing air, which flows in from the introduction opening 21a to pass through a side below the output shaft 42 along the lower casing section 2B as will be described below, to the central opening 20d.

As illustrated in FIG. 1, the gas guide section 21 is an air conducting passage that is related to the introduction opening 21a, and communicates with the inside of the casing 2 downstream in an air-sending direction of the fan case C via the introduction opening 21a, wherein the introduction opening 21a is pointing the upward direction of the casing 2.

The base frame 3 is a holding member that has a plurality of fitting openings 30 into which the elastic members 7 are fitted, a motor holder 31 holding the motor 4 via a connecting member 43 (to be described below), and a heat sink member fixture 32 supporting the heat sink member 6. Moreover, the base frame 3 further includes a circuit board fixture 35 fixing the circuit board 5. This base frame 3 fits the plurality of elastic members 7 into the protrusion sections 20f, and thereby is elastically supported by the upper casing section 2A.

A predetermined space is provided between the heat sink member exposure opening 20e of the casing 2 and an outer periphery of the upper end 60 of the heat sink member 6. A frame-shaped elastic member 7a, which can maintain water tightness (drip-proof) of the upper casing section 2A even if a width of the predetermined space varies under the influence of vibration during operation of the motor 4, is interposed in this space. In this way, the plurality of these elastic members 7 and 7a are interposed inside the casing 2, and thereby the base frame 3 is elastically supported (floated) in the casing 2. The elastic members 7 are fixed to the upper casing section 2A by fastening members such as screws, and do not drop from the protrusion sections 20f.

As illustrated in FIGS. 4A and 4B along with FIG. 5, the motor 4 and the heat sink member 6 are mounted on a surface (hereinafter referred to as a front surface) of the base frame 3 which is located at the upper casing section 2A side, and the circuit board 5 is mounted on a surface (hereinafter referred to as a rear surface) of the base frame 3 which is located at the lower casing section 2B side. The motor holder 31 is a part that is recessed in a circular shape along a shape of the motor 4 mounted on the front surface of the base frame 3. An output shaft opening 31a into which the output shaft 42 is passed, base frame openings 33 (33a and 33b), and a lower ball bearing holder 34 are formed in the center of the part recessed in the circular shape of the motor holder 31.

The base frame openings 33 have a board-side opening 33a that is formed at a position corresponding to a cut-out portion 50 of the circuit board 5 (to be described below), and motor-side openings 33b that are a plurality of fan-shaped openings arranged to correspond in an approximately semi-circular range to slot positions of teeth 40f of the motor 4 (to be described below). The board-side opening 33a and the motor-side openings 33b are provided to pass the air flows of the introducing air between the lower casing section 2B and the base frame 3 from the introduction opening 21a toward the central opening 20d of the upper casing section 2A.

The lower ball bearing holder 34 is a rear surface of the motor holder 31 and is a cylindrical bearing boss formed around the output shaft opening 31a.

As illustrated in FIG. 3, the connecting member 43 has a lower ball bearing 43c held on the aforementioned lower ball bearing holder 34 to be slidable in a direction of the output shaft 42, an upper ball bearing 43b, and a sleeve member 43a. The sleeve member 43a is an annular member that is provided between the stator core 40a and the upper ball bearing 43b and fixes the upper ball bearing 43b to a stator core 40a. The output shaft 42 is inserted into a central opening of this sleeve member 43a without contact, and the sleeve member 43a is fixed to an upper surface side of the lower ball bearing holder 34 of the base frame 3.

The output shaft 42 is press-fitted into an inner race portion of the upper ball bearing 43b, and the sleeve member 43a is press-fitted onto an outer race portion of the upper ball bearing 43b. Thereby, the upper ball bearing 43b rotatably supports the output shaft 42 inside the sleeve member 43a. The output shaft 42 is press-fitted into an inner race portion of the lower ball bearing 43c, and an outer race portion of the lower ball bearing 43c is slidably-fitted into the lower ball bearing holder 34 of the base frame 3 in the axial direction of the output shaft 42. Thereby, the lower ball bearing 43c rotatably supports the output shaft 42. To bias the upper ball bearing 43b and the lower ball bearing 43c to thereby apply a predetermined pressure to each ball bearing, a wave washer 43d is interposed between the outer race of the lower ball bearing 43c and the lower ball bearing holder 34.

The motor 4 is a 3-phase AC brushless motor that is pivotably supported via the connecting member 43 by the base frame 3. This motor 4 is provided with a stator 40, a rotor 41, and the output shaft 42. FIG. 5 is an exploded perspective view including a part of the motor 4 and the base frame 3. The stator 40 of the motor 4 is provided with the stator core 40a, an upper insulator 40b, a lower insulator 40c, and windings 40d. Further, the stator core 40a is provided with a yoke 40e and the teeth 40f. The yoke 40e is a cylindrical portion in central part of the stator core 40a, and the sleeve member 43a is press-fitted inside the yoke 40e. Thereby, the stator 40 is fixed to the base frame 3. A plurality of yoke openings 40g are formed in this yoke section 40e. The teeth 40f are a plurality of field parts that are formed to radially protrude from an outer circumference of the yoke 40e in a direction perpendicular to the output shaft 42 and are intended to generate a rotating magnetic field in a circumferential direction centered on the output shaft 42. In the present embodiment, the teeth 40f give a constitution of 15 slots by way of example.

The upper insulator 40b and the lower insulator 40c are insulating members that are provided to cover a surface of the stator core 40a and are formed by a resin material. As the stator core 40a is sandwiched between the upper insulator 40b and the lower insulator 40c in a vertical axial direction, the windings 40d and the stator core 40a are insulated. The windings 40d are wound around the teeth 40f more than once in a state while the stator core 40a is insulated by the upper insulator 40b and the lower insulator 40c. Each of the windings 40d of three-phase is a metal thin wire (a copper wire) whose surface is covered with an insulating coating layer such as enamel. The upper insulator 40b has upper insulator openings 40h formed at positions at which they are related to the flow of the introducing air for the yoke openings 40g of the yoke 40e. Similarly, the lower insulator 40c also has lower insulator openings 40k formed at positions at which they are related to the flow of the introducing air for the yoke openings 40g. Therefore, as the yoke openings 40g, the upper insulator openings 40h, and the lower insulator openings 40k are superposably disposed, gas flow channels 4A are formed inside the motor 4 as illustrated in FIG. 3.

Figure 5:
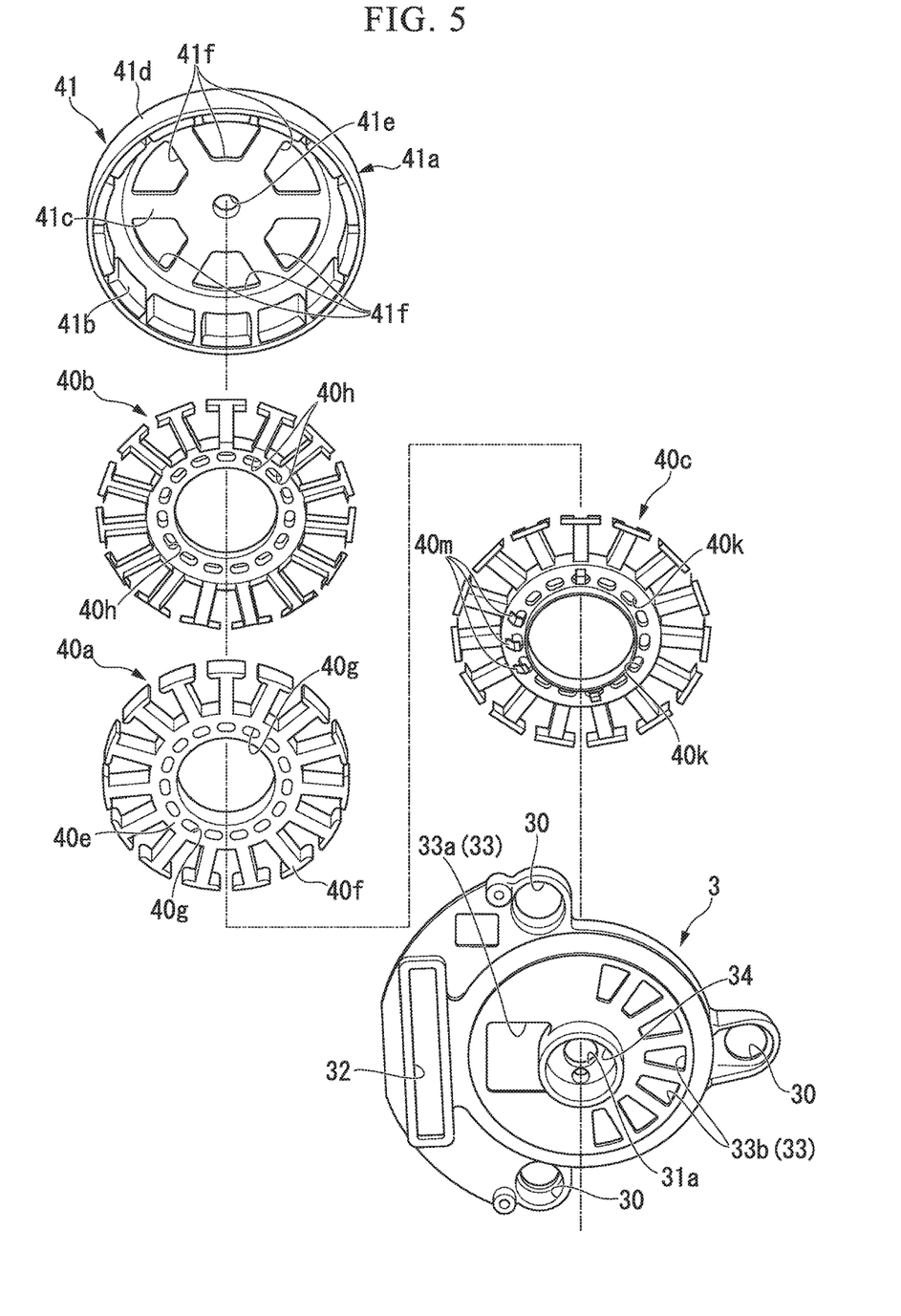
FIG. 5 is an exploded perspective view including a part of a blower motor and a base frame in the embodiment of the present invention.

As illustrated in FIG. 5, L-shaped winding catches 40m projected from circumferential walls of the lower insulator openings 40k toward a lower side of the motor 4 are formed at a position corresponding to the board-side opening 33a of the base frame 3 at the lower insulator openings 40k of the lower insulator 40c. The windings 40d are tied on the winding catches 40m, and are inserted into the board-side opening 33a to run along an axis of the output shaft 42, thereby being drawn out to the lower side of the motor 4.

The rotor 41 is a rotary member (an outer rotor) which is outside the stator 40, is fitted onto and connected to the output shaft 42 at an upper side of the stator 40, and is rotatably provided around the stator 40. This rotor 41 is provided with a frame 41a at which a circular top section 41c and a circumferential surface section 41d are formed, and a plurality of magnets 41b that are disposed on an inner surface of the circumferential surface section 41d to face the stator 40.

This frame 41a has an output shaft fixture 41e to which the output shaft 42 is fixed after being inserted into the center of the top section 41c. Moreover, the frame 41a has a plurality of rotor openings 41f formed around the output shaft fixture 41e. The magnets 41b are provided inside the circumferential surface section 41d of the frame 41a in a plurality of rows to form a plurality of magnetic poles that are facing each other with a predetermined gap therebetween in an outer circumferential direction of the stator core 40a. In the present embodiment, the magnets 41b give a constitution of 14 pieces (14 poles) by way of example. The circular top section 41c of the rotor 41 is exposed from the central opening 20d of the upper casing section 2A.

As illustrated in FIGS. 4A and 4B, the circuit board 5 has an approximately semi-circular shape and is screwed to the circuit board fixture 35 of the base frame 3 by a plurality of screw members. As illustrated in FIG. 3, the circuit board 5 is supported by the base frame 3, and thereby is spaced from the casing 2 inside the casing 2. When viewed in the axial direction of the output shaft 42 of the motor 4, this circuit board 5 is disposed between the introduction opening 21a of the casing 2 and the output shaft 42 of the motor 4. That is, the circuit board 5 is housed inside the casing 2, and is supported by the base frame 3 to be disposed at a position eccentric with respect to the output shaft 42. The circuit board 5 is supported by the base frame 3 to be separated (deviated, displaced) from the output shaft 42 in a radial direction of the output shaft 42. Thereby, the circuit board 5 is disposed within streamlines of air flowing from the introduction opening 21a to the central opening 20d.

This circuit board 5 has the cut-out portion 50 formed at a position corresponding to the board-side opening 33a of the base frame 3 in the vicinity of the output shaft 42. Further, the circuit board 5 is provided with a connecting terminal 51 adjacent to the cut-out portion 50. This connecting terminal 51 has a connecting concave that is to catch an end of the windings 40d of the motor 4. The connecting concave has an open side that is forming approximate U shape when a state of the end of the windings 40d is unconnected to the connecting concave. The ends of the windings 40d of the motor 4 which are drawn out to the lower side of the motor 4 via the board-side opening 33a are caught by the connecting concave, and are clamped by the connecting concave. Thereby the motor 4 and the circuit board 5 are electrically connected.

A drive circuit that is provided with a switching element for supplying a PWM controlled drive current to the motor and a control circuit that is connected to the switching element and supplies a control signal to the switching element are disposed on this circuit board 5. The magnets 41b of the rotor 41 are attracted by rotating magnetic fields of the stator core 40a and the windings 40d which are generated on the basis of an instruction from this circuit board 5, and thereby the rotor 41 is rotated. The control circuit is a sensorless control system that does not require a rotation detection sensor. Thereby, the circuit board 5 need not be provided with a rotation angle detector for detecting a state of a rotation angle of the output shaft 42 in the vicinity of the output shaft 42. Therefore, the cut-out portion 50 can be easily formed in the vicinity of the output shaft 42.

An upper thermal conductive surface (a thermal pad) that is adjacently installed to allow thermal conduction with a lower end side of the heat sink member 6 exposed to the rear surface side of the base frame 3 is formed at the circuit board 5. A lower thermal conductive surface (a thermal land) on which electronic parts having a large amount of heat generation such as the switching element of the drive circuit are mounted is formed on the opposite surface of the upper thermal conductive surface, and the upper thermal conductive surface and the lower thermal conductive surface are connected by thermal conducting means (not shown) such as a thermal through-hole. Thereby, the heat sink member 6 can efficiently discharge heat of the circuit board 5 outside of the blower motor unit 1. Thermal conductive grease or a sheet-like thermal conducting member may be fixedly sandwiched between the lower end side of the heat sink member 6 and the upper thermal conductive surface. In this case, the heat of the circuit board 5 can be more efficiently discharged to the outside of the blower motor unit 1.

Subsequently, an operation of the blower motor unit 1 according to the present embodiment will be described with reference to FIGS. 3 and 6.

In the blower A provided with this blower motor unit 1, when a rotating magnetic field is generated at the stator 40 on the basis of an instruction from the circuit board 5, the rotor 41, the output shaft 42, and the blower fan B are rotated as one body. When the blower fan B is rotated in this way, the blower fan B suctions air from the air inlet C1 side of the fan case C, and sends it via the air outlet. Here, as illustrated in FIG. 3, part of the sent air having a positive pressure due to the blower fan B flows into the blower motor unit 1 from the introduction opening 21a communicating downstream in an air-sending direction of the air of the fan case C. In this way, the air introduced into the casing 2 from the introduction opening 21a passes through the gas guide section 21, and branches off in multiple directions. Here, part of the air flows into the upper side of the base frame 3, namely the air gap between the base frame 3 and the upper casing section 2A.

Figure 6:
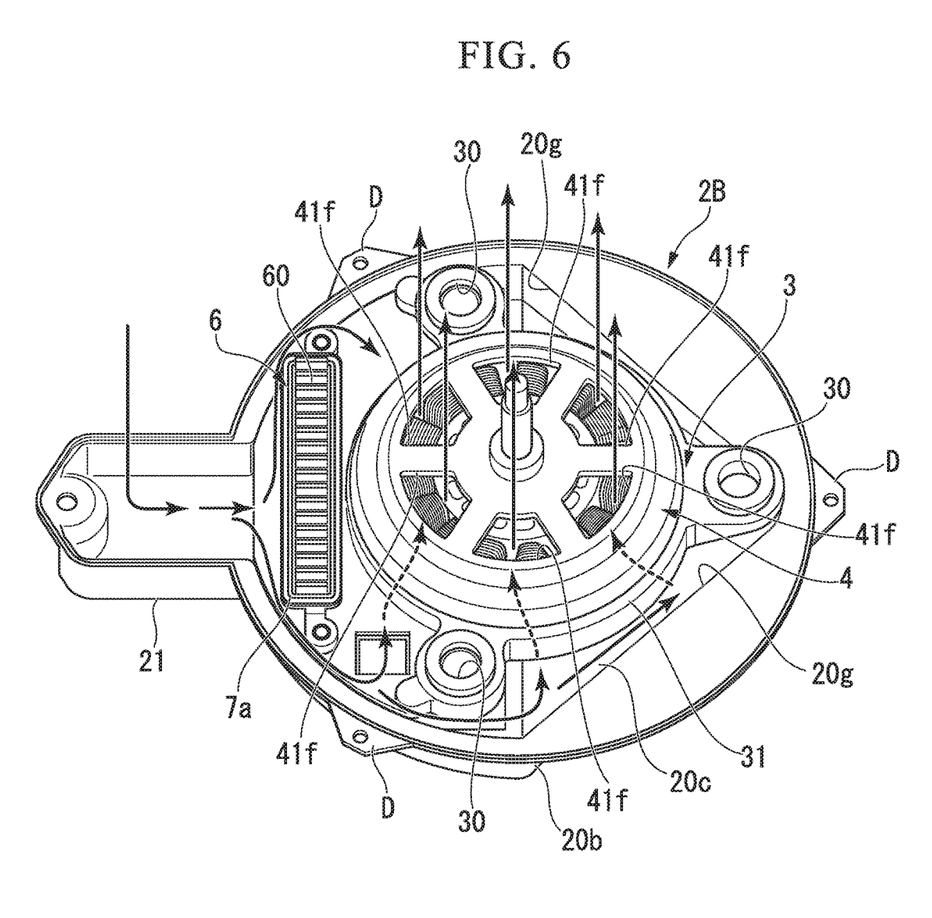
FIG. 6 is a perspective view including the lower casing section indicating a flow of air inside the blower motor unit according to the embodiment of the present invention.

As illustrated in FIG. 6, the air flowing into the upper side of the base frame 3 comes into contact with the heat sink member 6, and flows along the heat sink member 6 in a direction of the circumferential surface section 20b of the casing 2, thereby cooling the upper side of the circuit board 5 and the heat sink member 6. Further, the air cooling the heat sink member 6 to flow out in the direction of the circumferential surface section 20b proceeds to an inner upper side of the casing 2 along the outer periphery of the rotor 41, passes through the central opening 20d, and is discharged to the fan case C side.

The remaining air flows into the lower side of the base frame 3 and the circuit board 5, namely the air gap between the circuit board 5 and the lower casing section 2B, and that is, the air gap between the base frame 3 and the lower casing section 2B. A part of the air flowing into the air gap between the circuit board 5 and the lower casing section 2B passes the cut-out portion 50 of the circuit board 5 in front of the output shaft 42 (at the left side of the output shaft 42 in FIG. 3), and then proceeds to the board-side opening 33a of the base frame 3. The rest of the air flowing into the air gap between the circuit board 5 and the lower casing section 2B reaches the back of the output shaft 42 (the right side of the output shaft 42 in FIG. 3) while cooling the lower side of the circuit board 5, and then proceeds to the motor-side openings 33b of the base frame 3.

The air proceeding to the cut-out portion 50 of the circuit board 5 and the motor-side openings 33b of the base frame 3 in this way passes through the gas flow channels 4A and the slot of between the teeth 40f of the stator core 40a to cool the entire of the stator 40. Then, the air cooling the stator 40 is discharged from the rotor openings 41f of the rotor 41 to the fan case C side. At this point, the introducing air, which flows into the air gap between the circuit board 5 and the lower casing section 2B to pass through the lower side of the output shaft 42 along the lower casing section 2B, is guided by the guide section 20g into the axial direction of the output shaft 42. Thereby, the introducing air is introduced from the air gap to the motor-side openings 33b, and does not stay in the lower casing section 2B. Further, the air discharged to the fan case C side flows along the outer surface of the upper casing section 2A toward the introduction opening 21a, and is fed back to outflow air sent out in a centrifugal direction by the blower fan B.

The air flowing along the outer surface of the upper casing section 2A toward the introduction opening 21a comes into contact with the upper end 60 of the heat sink member 6. Therefore, since the heat sink member 6 is cooled by both of the flow of the air inside the casing 2 and the flow of the air outside the casing 2, heat of heat sink parts of the circuit board 5 is efficiently discharged to the outside.

According to this blower motor unit 1 of the present embodiment, the base frame 3 supporting the circuit board 5 is provided. Thereby, the circuit board 5 can be disposed within the streamlines of the introducing air, and be efficiently cooled.

Further, according to the blower motor unit 1 of the present embodiment, the base frame 3 supports the circuit board 5 such that the circuit board 5 is spaced from the casing 2. Thereby, the air gap through which the air can circulate is formed between the circuit board 5 and the casing 2, and the circuit board 5 can be cooled from both sides thereof. Therefore, the circuit board 5 can be efficiently cooled thereby.

According to the blower motor unit 1 of the present embodiment, the casing 2 has the introduction opening 21a in the gas guide section 21. Thereby, the flow of the air caused by the blower fan B can efficiently flow into the casing 2. Therefore, the circuit board 5 can be efficiently cooled thereby.

According to the blower motor unit 1 of the present embodiment, the central opening 20d is provided, and the circuit board 5 is disposed within the streamlines of the air flowing from the introduction opening 21a to the central opening 20d. Thereby, the circuit board 5 is efficiently cooled by the flow of the air.

According to the blower motor unit 1 of the present embodiment, the base frame 3 is provided with the board-side opening 33a and the motor-side openings 33b within the streamlines of the air flowing from the introduction opening 21a to the central opening 20d. Thereby, the air can flow from the introduction opening 21a to the central opening 20d without barring the flow of the air due to the base frame 3. Therefore, the entire blower motor unit 1 can be efficiently cooled.

According to the blower motor unit 1 of the present embodiment, the circuit board 5 is provided with the cut-out portion 50 corresponding to the board-side opening 33a within the streamlines of the introducing air flowing from the introduction opening 21a to the central opening 20d. Thereby, the introducing air can flow from the introduction opening 21a to the central opening 20d without barring the streamlines due to the circuit board 5. Therefore, the entire blower motor unit 1 can be efficiently cooled.

According to the blower motor unit 1 of the present embodiment, the stator core 40a, the upper insulator 40b, and the lower insulator 40c have the yoke openings 40g, the upper insulator openings 40h, the lower insulator openings 40k, respectively. Thereby, the gas flow channels 4A are formed. Moreover, the rotor openings 41f are also formed in the rotor 41. Thereby, the air inside the casing 2 passes through the gas flow channels 4A and is discharged from the central opening 20d to the outside. Therefore, the air inside the casing 2 can be efficiently discharged to the outside, and the entire blower motor unit 1 can be efficiently cooled.

According to the blower motor unit 1 of the present embodiment, the casing 2 is provided with the guide wall section 20g. Thereby, the introducing air passing through the lower side of the output shaft 42 along the lower casing section 2B is guided to the motor-side openings 33b of the base frame 3 by the guide wall section 20g, and does not stay in the casing 2. Therefore, the entire blower motor unit 1 can be efficiently cooled.

According to the blower motor unit 1 of the present embodiment, the heat sink member 6 is provided that has the upper end 60, which is partially exposed outside the casing 2 and is adjacent to the circuit board 5. Since this heat sink member 6 is cooled by both of the flow of the introducing air inside the casing 2 and the flow of the air outside the casing 2, heat of heat sink parts of the circuit board 5 is efficiently discharged to the outside. Therefore, the circuit board 5 can also be efficiently cooled thereby.

Although the embodiment of the present invention has been described above, the present invention is not limited to the above embodiment, and includes various changes in design without departing from the scope of the present invention. For example, the following modifications can be conceived.

(1) In the above embodiment, the base frame 3 is supported via the elastic members 7 by the top section 20a of the casing 2, but the present invention is not limited thereto. The base frame 3 may be directly fixed to the top section 20a and/or the bottom section 20c of the casing 2.

(2) In the above embodiment, the electronic parts such as the switching element having a large amount of heat generation are mounted on the lower thermal conductive surface (the thermal land) of the circuit board 5, and the lower end side of the heat sink member 6 exposed to the rear surface side of the base frame 3 and the upper thermal conductive surface (the thermal pad) of the circuit board 5 are adjacently installed to allow thermal conduction, but the present invention is not limited thereto. The electronic parts such as the switching element may be mounted at the upper side of the circuit board 5, and the lower end side of the heat sink member 6 may be adjacently installed above the electronic parts.

(3) In the above embodiment, the guide wall section 20g of the casing 2 is formed on the tapered surface becoming the tapered shape at the position opposite to the gas guide section 21, but the present invention is not limited thereto. The guide wall section 20g may be formed to follow a planar shape of the base frame 3 in a curved shape at the position opposite to the gas guide section 21. According to this guide wall section 20g, the introducing air passing through the lower side of the output shaft 42 along the lower casing section 2B is guided by the wall section 20g of the curved shape into the axial direction of the output shaft 42. Thereby, the air is introduced from the air gap to the motor-side openings 33b, and does not stay in the lower casing section 2B.

What is claimed is:

1. A blower comprising:
   a fan case configured to be connected to a duct constituting an air conditioner for a vehicle;
   a blower fan configured to be housed in the fan case;
   a brushless motor which includes an output shaft coupled with the blower fan, a stator, and a gas flow channels through which an introducing air passes, wherein the stator is provided with a stator core, an upper insulator, a lower insulator, and windings;
   a base frame configured to support the output shaft and the stator core;
   a circuit board configured to allow the brushless motor to be driven by a supply of an electric power; and
   a casing which includes an upper casing section and a lower casing section, and is attached to the fan case, wherein
   the upper casing section comprises:
      an air introduction opening which is on a side of the blower fan, is open to the fan case, and introduces an air within the fan case to an inside of the casing, the air being sent by the blower fan through the duct to the fan case and having a positive pressure, and
      a central opening which is provided around the output shaft and discharges the air, which is introduced through the air introduction opening, from the inside of the casing to the fan case,
   the lower casing section is provided at a position lower than the output shaft, and
   the upper casing section and the lower casing section are configured to be combined with each other so as to:
      form a gas guide section which is an air conducting passage communicating with the air introduction opening, and thereby communicating with a downstream in an air-sending direction in the fan case, and
      house the brushless motor, the circuit board, and the base frame, wherein
   the lower casing section of the casing comprises:
      a bottom section communicating with the gas guide section and guiding the introducing air so as to pass around a bottom of the output shaft, and
      a wall section communicating with the bottom section and guiding the introducing air to the central opening, wherein
   the base frame comprises:
      a circuit board fixture to which the circuit board is fixed such that substantially an entire surface of the circuit board faces the introducing air passing along the bottom section, and
      a plurality of base frame openings provided within the streamlines of the introducing air guided by the wall section toward the central opening such that the introducing air passes the stator, and wherein
   the circuit board is disposed at a position eccentric with respect to the output shaft of the brushless motor toward the air introduction opening,
   the circuit board is fixed to the circuit board fixture of the base frame so as to be spaced from the casing, in a range of the streamlines of the introduction air flowing from the air introduction opening to the central opening, the circuit board is formed in substantially semicircular shape so as to allow the introducing air passing toward the base frame openings, and the circuit board is disposed within the streamlines between the air introduction opening of the casing and the output shaft.

2. The blower according to claim 1, further comprising a heat sink member provided on the base frame at a position within the streamlines of the introduction air flowing from the air introduction opening to the central opening, wherein:

the heat sink member is partially exposed outside the casing; and the heat sink member is adjacent to the circuit board to allow thermal conduction.

3. The blower according to claim 1, wherein the wall section comprises a guide wall section which is a standing wall section that rises from the bottom section of the lower casing section and becomes a tapered shape to form a tapered surface at a position opposite to the gas guide section.

4. The blower according to claim 1, wherein the base frame is a unitary structure.

\* \* \* \* \*